United States Patent
Muro

(10) Patent No.: US 7,077,058 B2
(45) Date of Patent: Jul. 18, 2006

(54) FRUIT AND VEGETABLE PEELER

(75) Inventor: Giichiro Muro, Tokyo (JP)

(73) Assignee: Muro Corporation, Tokyo (JP)

(*) Notice: Subject to any disclaimer, the term of this patent is extended or adjusted under 35 U.S.C. 154(b) by 149 days.

(21) Appl. No.: 10/967,225

(22) Filed: Oct. 19, 2004

(65) Prior Publication Data

US 2005/0109224 A1    May 26, 2005

(30) Foreign Application Priority Data

Oct. 20, 2003    (JP) .............................. 2003-359345

(51) Int. Cl.
*A23N 7/00* (2006.01)
(52) U.S. Cl. ............................ 99/541; 99/588; 99/590; 99/594; 99/596; 99/598
(58) Field of Classification Search ................ 99/515, 99/539–544, 584, 587, 588–599, 623–626; 426/481–483

See application file for complete search history.

(56) References Cited

U.S. PATENT DOCUMENTS

| | | | | |
|---|---|---|---|---|
| 3,211,202 A | * | 10/1965 | Mason | 99/592 |
| 3,881,406 A | * | 5/1975 | Perez | 99/594 |
| 3,982,482 A | * | 9/1976 | Webb et al. | 99/491 |
| 4,350,088 A | * | 9/1982 | Rubio, Jr. | 99/538 |
| 4,581,990 A | * | 4/1986 | Matsumoto | 99/538 |
| 4,753,159 A | * | 6/1988 | Eaton | 99/567 |
| 4,765,234 A | * | 8/1988 | Cailliot | 99/593 |
| 5,097,758 A | * | 3/1992 | Fresh | 99/590 |
| 5,105,735 A | * | 4/1992 | Gonzalvo | 99/590 |
| 5,558,011 A | * | 9/1996 | Heim | 99/595 |
| 5,950,528 A | * | 9/1999 | Wang | 99/542 |
| 6,516,713 B1 | * | 2/2003 | Holmander | 99/541 |
| 6,854,383 B1 | * | 2/2005 | Wang | 99/542 |

* cited by examiner

*Primary Examiner*—Timothy F. Simone
(74) *Attorney, Agent, or Firm*—Oblon, Spivak, McClelland, Maier & Neustadt, P.C.

(57) ABSTRACT

A fruit and vegetable peeler which is suitably used in general homes for peeling a small amount of fruits and vegetables, which is small-sized and light-weight, and which is further convenient in carrying and storage. A pair of clamp members are supported by a housing to lie in opposed relation, and a handle is fixed to a handle shaft extended externally of the housing. The housing accommodates a speed increasing gear mechanism for transmitting rotation of the handle shaft to a cup-shaped rotating blade, a transmission gear mechanism for transmitting the rotation of the handle shaft to the rotary shaft of the clamp member, and a rotating-blade swinging mechanism for converting the rotation of the handle shaft into a swing motion of the rotating blade along the circumference of a fruit/vegetable. The housing, a support frame for supporting the speed increasing gear mechanism, the transmission gear mechanism, and the rotating-blade swinging mechanism, and gears constituting those mechanisms are made of synthetic resin.

6 Claims, 7 Drawing Sheets

FRUIT AND VEGETABLE PEELER

BACKGROUND OF THE INVENTION

1. Field of the Invention

The present invention relates to a fruit and vegetable peeler which is suitably used in general homes, etc. for peeling skins of various fruits and vegetables having nearly spherical shapes, such as citrus fruits including grapefruits, oranges and Chinese citrons, with safety and ease in operation.

2. Description of the Related Art

A variety of fruit and vegetable peeling machines have hitherto been proposed for peeling skins of not only citrus fruits, but also other various fruits and vegetables in a large amount.

One example of those fruit and vegetable peeling machines is disclosed in Patent Reference 1; Japanese Examined Patent Application Publication No. 63-065306. More specifically, one piece of fruits and vegetables (referred to as a "fruit/vegetable" hereinafter) is held at its both ends between clamp members and is rotated by a motor. A cup-shaped rotating blade is rotatably held by a support arm around the fruit/vegetable and is rotated at a high speed by another motor. Further, the rotating blade is movable along the surface of the fruit/vegetable by the support arm while maintaining a relative positional relationship such that the axis of rotation of the rotating blade is parallel to a tangential line to the locus along which the surface of fruit/vegetable rotates, and the rotating blade is brought into contact with the surface of the fruit/vegetable from the outer side so as to cut into the fruit/vegetable.

That type of motor-driven fruit and vegetable peeling machine is designed on the premise that a user peels skins of fruits and vegetables in a large amount. Therefore, that type of motor-driven fruit and vegetable peeling machine is usually utilized in fruit and vegetable processing industries, food dispensing business such as hotels, and by distributors selling peeled fruits and vegetables, while it is not suitable for use in general homes. In practice, to improve workability, the fruit/vegetable and the rotating blade are rotated by a single motor or individually driven motors, and the rotating blade is moved manually or by a motor along the fruit/vegetable surface. Therefore, when such a motor-driven fruit and vegetable peeling machine is used to peel skins of fruits and vegetables in a small amount, peeling work can be finished in a very short time, whereas a lot of time and labor are required to wash and dry the peeling machine for storage after the use. In other words, a small amount of the fruit/vegetable can be manually peeled in a shorter time with more convenience for the user. In addition, because the motor-driven peeling machine is heavy and bulky, it is also troublesome to secure a storage space and to carry the machine to the storage space.

SUMMARY OF THE INVENTION

One technical object of the present invention is to provide a fruit and vegetable peeler which is suitably used in general homes for peeling a small amount of fruits and vegetables, which is small-sized and light-weight, and which is further convenient in carrying and storage.

Another technical object of the present invention is to provide a fruit and vegetable peeler which is manually operated without using motors to reduce the size and weight of the peeler, and which can peel skins using a single handle to eliminate a difficulty in operation caused when a plurality of handles and associated mechanism are used.

Still another technical object of the present invention is to provide a fruit and vegetable peeler which employs neither motors nor other electrically driven components, and which can be washed in whole for cleaning.

To achieve the above objects, the fruit and vegetable peeler of the present invention comprises a clamp rotating mechanism including a pair of clamp members supported by a housing to lie on an axis of rotation of one piece of fruits and vegetables in opposed relation, one of the pair of clamp members being rotatable by a rotary shaft, the other clamp member being movable in directions in which the clamp members approach or depart away from each other, thereby rotating the one piece of fruits and vegetables while holding both ends of the one piece of fruits and vegetables; and a handle fixed to a handle shaft extended externally of the housing, wherein the housing accommodates a speed increasing gear mechanism for transmitting rotation of the handle shaft to a cup-shaped rotating blade, a transmission gear mechanism for transmitting the rotation of the handle shaft to the rotary shaft of the clamp member, and a rotating-blade swinging mechanism for converting the rotation of the handle shaft into a swing motion causing the rotating blade to swing along the circumference of the one piece of fruits and vegetables held between the pair of clamp members from a position near one of the clamp members to another position near the other clamp member in a reciprocating manner, the housing is made of synthetic resin, and a support frame for supporting the speed increasing gear mechanism, the transmission gear mechanism, and the rotating-blade swinging mechanism, as well as gears constituting those mechanisms are made of synthetic resin.

In one preferable form of the present invention, the clamp members are supported to the housing through a closely-analogous translation mechanism that one of the pair of clamp members, which is movable in the directions in which the clamp members approach or depart away from each other, is rotatably coupled at two axially spaced positions to the housing by support levers being substantially parallel to each other and having almost the same length, and a spring is fitted to a joint portion between one of the support levers and the housing, thereby urging the one clamp member in the direction toward the other clamp member.

In another preferable form of the present invention, a rotating-blade support arm for holding a rotary shaft of the cup-shaped rotating blade is tiltably supported at a base end thereof to a reciprocating swing lever in a final stage of the rotating-blade swinging mechanism for causing the rotating blade to swing along the circumference of the one piece of fruits and vegetables in a reciprocating manner such that the reciprocating swing lever is tilted in a direction toward the center of the one piece of fruits and vegetables within a range in which meshing between a gear mounted over the rotary shaft of the rotating blade and a gear of the speed increasing gear mechanism for transmitting rotation to the former gear is ensured, and a spring force for biasing the rotating-blade support arm in the direction toward the center of the one piece of fruits and vegetables is exerted to act on the rotating-blade support arm.

In still another preferable form of the present invention, the rotating-blade support arm for holding the rotary shaft of the cup-shaped rotating blade is provided with a thickness adjusting member which abuts against the surface of the one piece of fruits and vegetables immediately before the rotating blade contacts with the surface of the one piece of fruits and vegetables, thereby setting the thickness of a peeled skin, the thickness adjusting member being displaceable to one of multi-stage setting positions for the thickness of the peeled skin.

Further, the peeler of the present invention has no electrically driven components inside and outside the housing, and many water drain holes are bored through a bottom plate of the housing for draining water after washing of the peeler. In addition, a grip is attached to a top of the housing for easier carrying of the peeler.

In the peeler of the present invention having the structure described above, when one piece of fruits and vegetables (fruit/vegetable) is held at its both ends by the pair of clamp members of the clamp rotating mechanism and the handle is manually rotated, the rotation is transmitted to the rotary shaft of the clamp member through the transmission gear mechanism in the housing, to thereby rotate the fruit/vegetable. Further, the rotation of the handle shaft is transmitted to the cup-shaped rotating blade through the speed increasing gear mechanism, and at the same time the rotation of the handle shaft causes the rotating-blade support arm to swing through the reciprocating swing lever of the rotating-blade swinging mechanism. As a result of those combined operations with each other, the rotating blade pressed by the spring against the fruit/vegetable held between the clamp members is moved along the circumference of the fruit/vegetable while peeling the skin of the fruit/vegetable. Hence, the fruit/vegetable can be almost entirely peeled except for both the end portions where the fruit/vegetable is held by the clamp members.

Since one clamp member is supported to the housing through the closely-analogous translation mechanism, the center of the fruit/vegetable can be clamped by the pair of clamp members with fair ease when the fruit/vegetable is set between the clamp members.

In the case of, as intended by the present invention, manually operating the peeler for a reduction of the size and weight without using motors, it is difficult to operate a plurality of handles. In the peeler of the present invention, however, the single handle is employed to drive the clamp rotating mechanism, to rotate the cup-shaped rotating blade, and to move the rotating blade along the surface of the fruit/vegetable with the swing motion of the rotating-blade support arm. Hence, the fruit/vegetable can be easily peeled by one operator rotating the single handle.

At that time, the thickness of the peeled skin of the fruit/vegetable is set to the predetermined value by previously moving the thickness adjusting member provided on the rotating-blade support arm to a desired one of the multi-stage setting positions. Stated another way, since the rotating blade and the thickness adjusting member are always pressed against the surface of the fruit/vegetable by the spring, the rotating blade is cut into the fruit/vegetable within the allowable range limited by the thickness adjusting member. As a result, the skin of the fruit/vegetable is peeled at the preset thickness.

Since the peeler of the present invention employs no motors, the overall peeler size can be reduced. Furthermore, the housing is made of synthetic resin, and so are the support frame for supporting the speed increasing gear mechanism, the transmission gear mechanism, and the rotating-blade swinging mechanism, as well as other main components of the driving system, such as the gears constituting those mechanisms. In other words, except for some small metal-made parts, such as springs, long rotary shafts, screws, and pins, the other components are made of synthetic resin. Therefore, the total weight can be reduced and the peeler is very convenient when carried with the grip held by the user's hand and stored. Thus, in combination with the above-mentioned feature of the manual operation, the peeler is suitable for peeling a small amount of fruits and vegetables in general homes.

In addition, since neither motors nor any other electrically driven components are employed, the primary components are made of synthetic resin, and the many water drain holes are bored through the bottom plat for draining water, the peeler can be washed in whole with cold or warm water, and hence work for cleaning and storing the peeler after the use can be very easily performed.

According to the present invention set forth above, the fruit and vegetable peeler can be obtained which is suitably used in general homes for peeling a small amount of fruits and vegetables, which is small-sized and light-weight, and which is further convenient in carrying and storage. To reduce the size and weight of the peeler, the peeler is manually operated without using motors. In addition, the peeler can peel skins using a single handle to eliminate a difficulty in operation caused when a plurality of handles and associated mechanism are used. It is therefore possible to simply and easily peel fruits and vegetables. Moreover, since the peeler can be washed in whole with cold or warm water, work for cleaning and storing the peeler after the use can be simplified.

DESCRIPTION OF THE PREFERRED EMBODIMENTS

Figure 1:
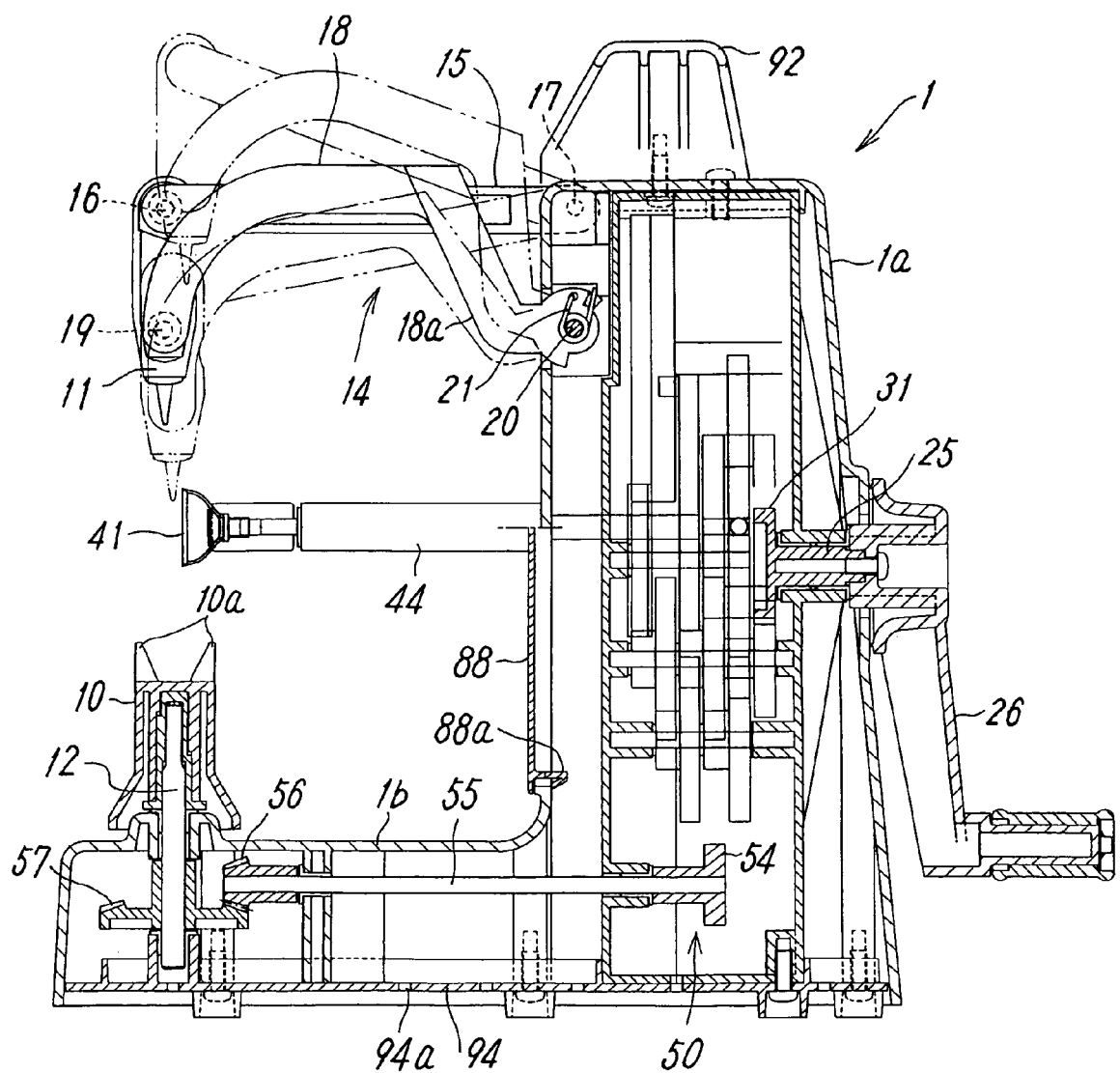
FIG. 1 is a side sectional view of a fruit and vegetable peeler according to an embodiment of the present invention.

The attached drawings show a fruit and vegetable peeler according to an embodiment of the present invention.

The fruit and vegetable peeler is to peel whole skins of fruits and vegetables by bringing a rotating blade under rotation into contact with the skin of a fruit/vegetable C under rotation, and slowly moving a rotary shaft of the rotating blade along the surface of the fruit/vegetable C. In particular, the peeling is performed by manually rotating a handle without resorting to motor-driven operation. Stated another way, the fruit and vegetable peeler of the present invention is deigned to be adapted primarily for the case being used in general homes, etc., instead of being adapted for the case of peeling a large amount of fruits and vegetables in fruit and vegetable processing industries, food dispensing business such as hotels, and by distributors selling peeled fruits and vegetables.

The structure of the illustrated peeler will be first described below. As seen from FIGS. 1 to 3, the peeler has a housing 1 made of synthetic resin and constituting an outer shell. The housing 1 comprises a main housing portion 1a for primarily accommodating various mechanisms of a driving system, and an extended base portion 1b connected to the main housing portion 1a and holding the fruit/vegetable C by a pair of clamp members 10, 11 arranged opposite to each other in the vertical direction.

The clamp members 10, 11 constitute a clamp rotating mechanism for rotating the fruit/vegetable C while holding it at both ends, and they are arranged opposite to each other on a vertical axis about which the fruit/vegetable is to be rotated.

One 10 of the clamp members is disposed in a state projecting upward from the extended base portion 1b of the housing 1. The clamp member 10 has a plurality of pawls 10a arranged along the circumference thereof to be pierced into the fruit/vegetable C for transmitting the rotation to it, and is mounted over a rotary shaft 12 rotatably supported by the extended base portion 1b. The rotation of a handle shaft 25 (described later) is transmitted to the rotary shaft 12 through a transmission gear mechanism 50.

The other clamp member 11 is supported to an upper region of the main housing portion 1a through a closely-analogous translation mechanism 14 and is movable in directions in which the clamp members 10, 11 approach or depart away from each other. The translation mechanism 14 comprises a first support lever 15 and a second support lever 18. The first support lever 15 is substantially linearly extended between one of two mount positions of the clamp member 11 spaced in the axial direction thereof, which is positioned near an upper end, and the upper region of the main housing portion 1a, and both ends of the first support lever 15 are rotatably mounted to that one mount position and the housing lower region by respective pins 16, 17. Both ends of the second support lever 18 are rotatably mounted by respective pins 19, 20 to the other mount position of the clamp member 11, which is positioned near a lower end, and a position in the upper region of the main housing portion 1a at a level lower than the position of the pin 17.

The second support lever 18 is curved upward while extending along the first support lever 15 and is branched on the side near the main housing portion 1a in the left and right direction, when viewed from the front (FIG. 2), into branch portions 18a. Distal ends of the branch portions 18a are rotatably mounted to left and right sides of the main housing portion 1a by respective pins 20. The pins 19, 20 used for mounting the second support lever 18 are located at positions descended almost equal distances from the pins 16, 17 used for mounting both the ends of the first support lever 15. Further, although the second support lever 18 is curved upward while extending along the first support lever 15, the distance between the pins 19 and 20 is almost equal to the distance between the pins 16 and 17 used for mounting the first support lever 15. Accordingly, the clamp member 11 is rotatably coupled to the housing by the two support levers 15, 18 that are substantially parallel to each other and have almost the same length. In other words, the clamp member 11 is supported to the main housing portion 1a through the closely-analogous translation mechanism 14.

A clamp spring 21 is fitted to each of joint portions with the pins 20 between both the branch portions 18a of the second support lever 18 and the main housing portion 1a so as to bias the clamp member 11 in the direction approaching the clamp member 10 mounted on the extended base portion 1b. Alternatively, the clamp spring 21 may be fitted to a joint portion with the pin 17 between the first support lever 15 and the main housing portion 1a.

In such a clamp rotating mechanism, since one of the two clamp members, i.e., the clamp member 11, is supported to the housing 1 through the closely-analogous translation mechanism 14, the center of the fruit/vegetable C can be relatively easily attached to the clamp members 10, 11 when the fruit/vegetable C is set between the pair of clamp members 10, 11.

The peeler is to manually peel the fruit/vegetable by using a handle. To that end, a handle 26 is fixed to the handle shaft 25 extended externally of the main housing portion 1a. The main housing portion 1a accommodates a speed increasing gear mechanism 40 for transmitting the rotation of the handle shaft 25 to the cup-shaped rotating blade 41, the transmission gear mechanism 50 for transmitting the rotation of the handle shaft 25 to the rotary shaft 12 of the clamp member 10, and a rotating-blade swinging mechanism 60 for converting the rotation of the handle shaft 25 into a swing motion causing the rotating blade 41 to swing along the circumference of the fruit/vegetable C held between the pair of clamp members 10, 11 from a position near one of the clamp members 10, 11 to another position near the other clamp member in a reciprocating manner. These mechanisms 40, 50 and 60 are supported to a support frame 30. The support frame 30 supports respective both ends of rotary shafts of gearings constituting those mechanisms accommodated in the main housing portion 1a. The support frame 30 is opened on the front side in the form of an opening 30b defined by an opening edge 30a so that the rotating blade 41 and the rotating-blade support arm 44 supporting the former (see FIGS. 1 and 5) are extended out through the opening 30b.

Figure 4:
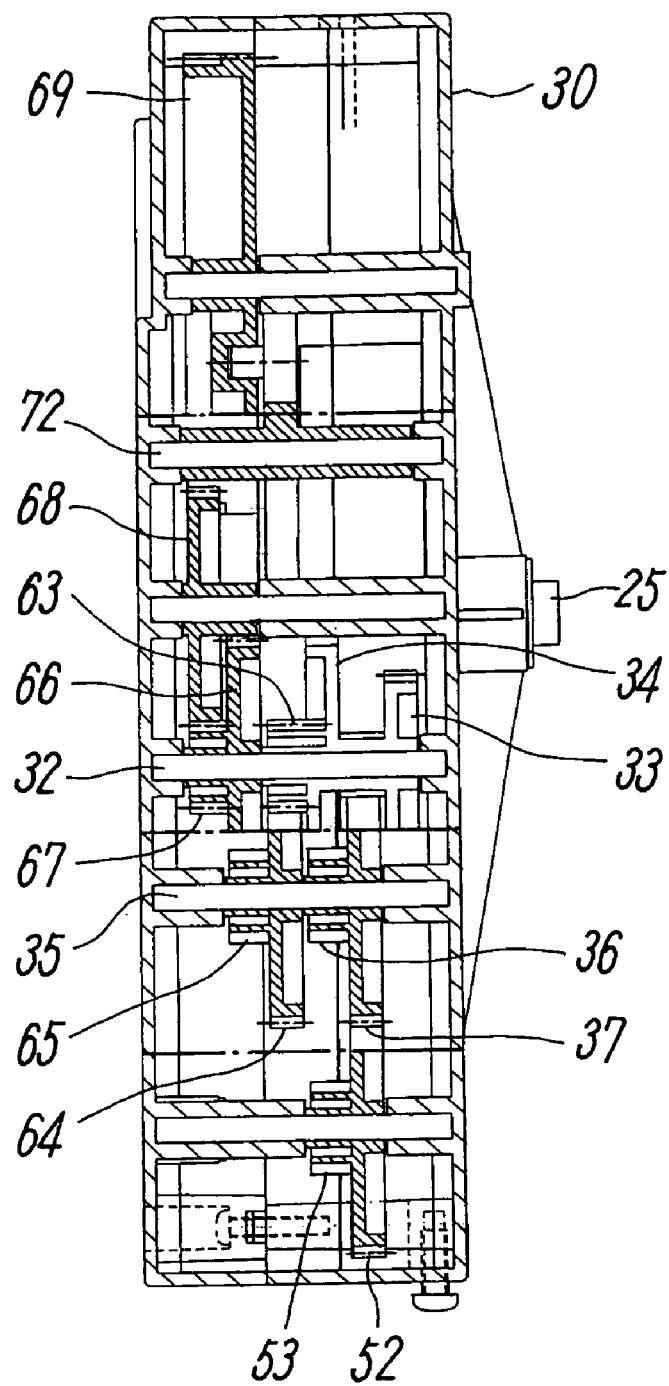
FIG. 4 is a vertical sectional view showing a primary structure within a support frame of the peeler according to the embodiment.

Incidentally, FIG. 4 shows, as a sectional view, a primary structure within the support frame 30.

As seen from FIGS. 3 to 5, the speed increasing gear mechanism 40 is constructed as follows. A gear 33 mounted over a support shaft 32 meshes with a gear 31 integrally mounted over the handle shaft 25, and a small gear 36 mounted over a support shaft 35 meshes with a gear 34 that is integral with the gear 33. A large gear 39 mounted over a support shaft 38 meshes with a gear 37 that is integral with the small gear 36, and a small gear 43 fixed to a rotary shaft 42 of the rotating blade 41 meshes with the large gear 39. The rotation of the handle shaft 25 is sped up and transmitted to the cup-shaped rotating blade 41 through a gear train made up of those gears. The support shaft 38 supporting the large gear 39 is held by the support frame 30 in such a position that its axis is directed substantially toward the center of the fruit/vegetable C held between the clamp members 10 and 11. Further, the support shaft 38 is slightly projected from the support frame 30 into the interior of the housing 1.

In addition, the rotary shaft 42 of the rotating blade 41 is rotatably supported within the rotating-blade support arm 44 mounted, by pins 45, to a reciprocating swing lever 74 (described later) which is rotatably supported over the support shaft 38 of the large gear 39.

Figure 2:
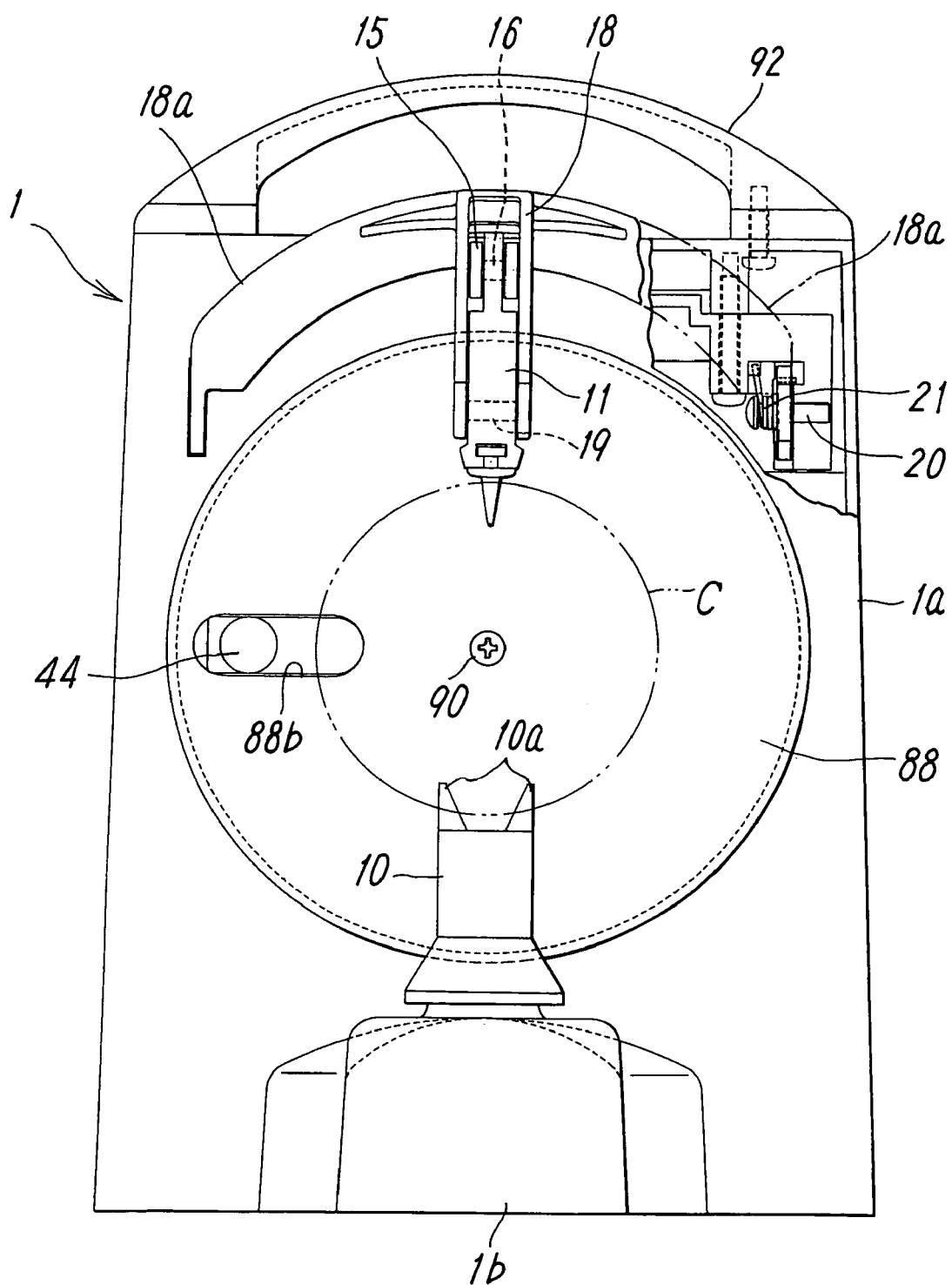
FIG. 2 is a front view of the peeler of the embodiment.
Figure 3:
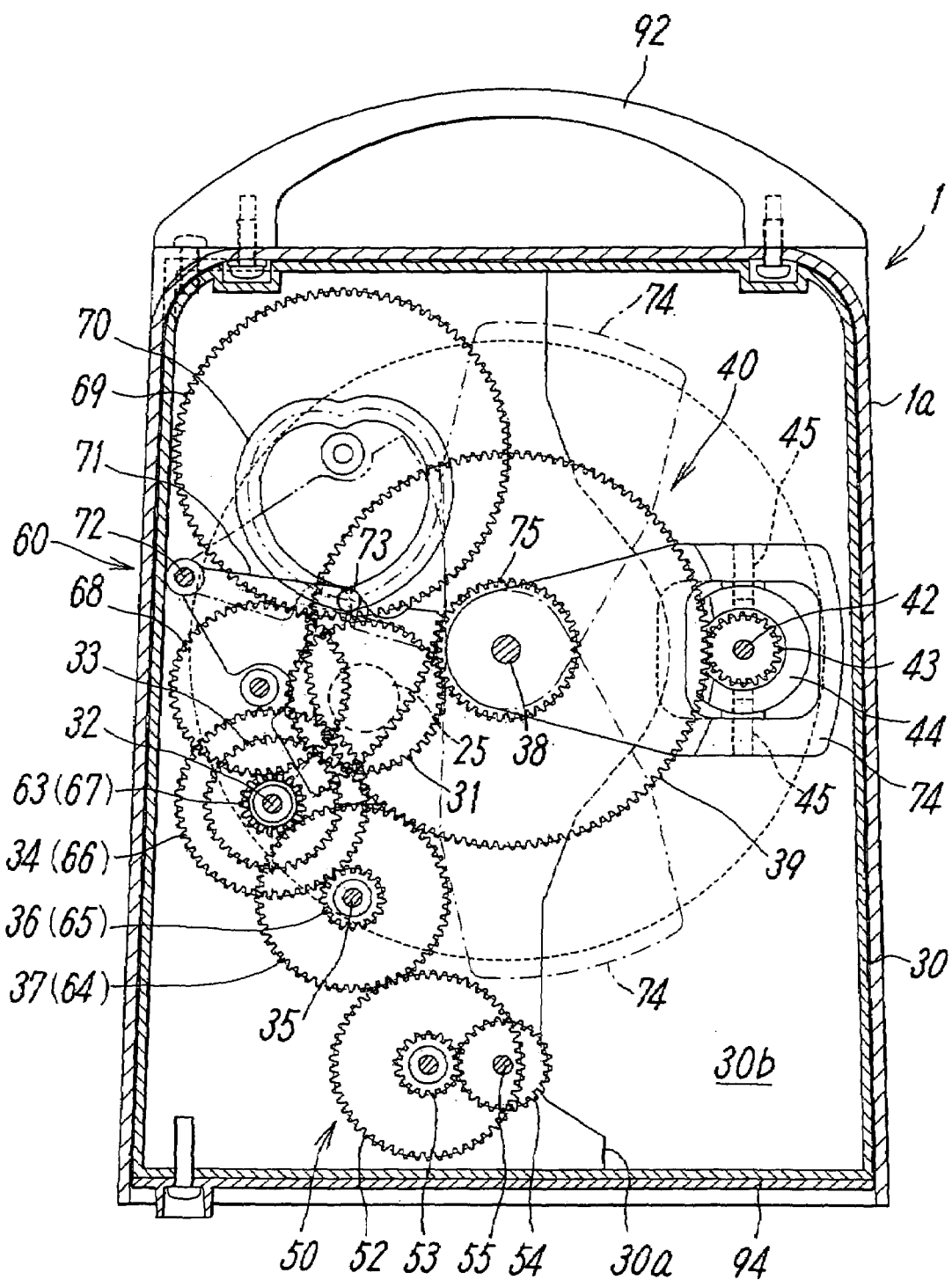
FIG. 3 is a sectional view, looked from the rear side, showing an internal mechanism of the peeler according to the embodiment.

As seen from FIGS. 1 and 3, the transmission gear mechanism 50 transmits the rotation to a rotary shaft 55 of a gear 54 through a gear 52 meshing with the gear 37, a gear 53 integral with the gear 52, and the gear 54 meshing with the gear 53. The rotary shaft 55 penetrates through the extended base portion 1b of the housing 1 to reach a position below the clamp member 10. A bevel gear 56 provided at a distal end of the rotary shaft 55 meshes with a bevel gear 57 provided over the rotary shaft 12 of the clamp member 10. With such an arrangement, the rotation of the handle shaft 25 is transmitted to the rotary shaft 12 of the clamp member 10, whereby the clamp member 10 is rotated at a speed suitable for peeling.

The rotating-blade swinging mechanism 60 transmits the rotation from a small gear 63, which is mounted over the support shaft 32 integrally with the gears 33, 34, through a gear 64 (reference numeral put in each parenthesis in FIG. 3 represents a gear having the same shape as a gear denoted by a corresponding numeral and disposed in exactly overlapped relation) meshing with the small gear 63, a small gear 65 integral with the gear 64, a gear 66 meshing with the small gear 65, a small gear 67 integral with the gear 66, a gear 68 meshing with the small gear 67, and a gear 69 meshing with the gear 68 while successively reducing the speed. Further, a heart-shaped cam groove 70 for swinging the rotating blade 41 is formed in the gear 69, and a slider 73 projected on a sector gear 71, which is supported at its pivotal portion to a rotary shaft 72, is fitted to the cam groove 70. The sector gear 71 is thereby swung with the rotation of the gear 69 in a reciprocating manner.

The sector gear 71 meshes with a gear 75 mounted to the reciprocating swing lever 74 that is rotatably supported on the support shaft 38 of the large gear 39. Accordingly, the reciprocating swing motion of the sector gear 71 is transmitted to the reciprocating swing lever 74 through the gear 75, whereby the rotary shaft 42 of the rotating blade 41 supported by the rotating-blade support arm 44 can be slowly swung along the circumference of the fruit/vegetable C in a reciprocating manner.

While, in this embodiment, the rotation of the gear 69 is converted into the reciprocating swing motion by utilizing the cam groove 70, the slider 73, the sector gear 71, etc., the present invention is not limited to such a mechanism. Any desired one of other various mechanisms can also be employed for converting the rotation into the reciprocating swing motion.

Figure 5:
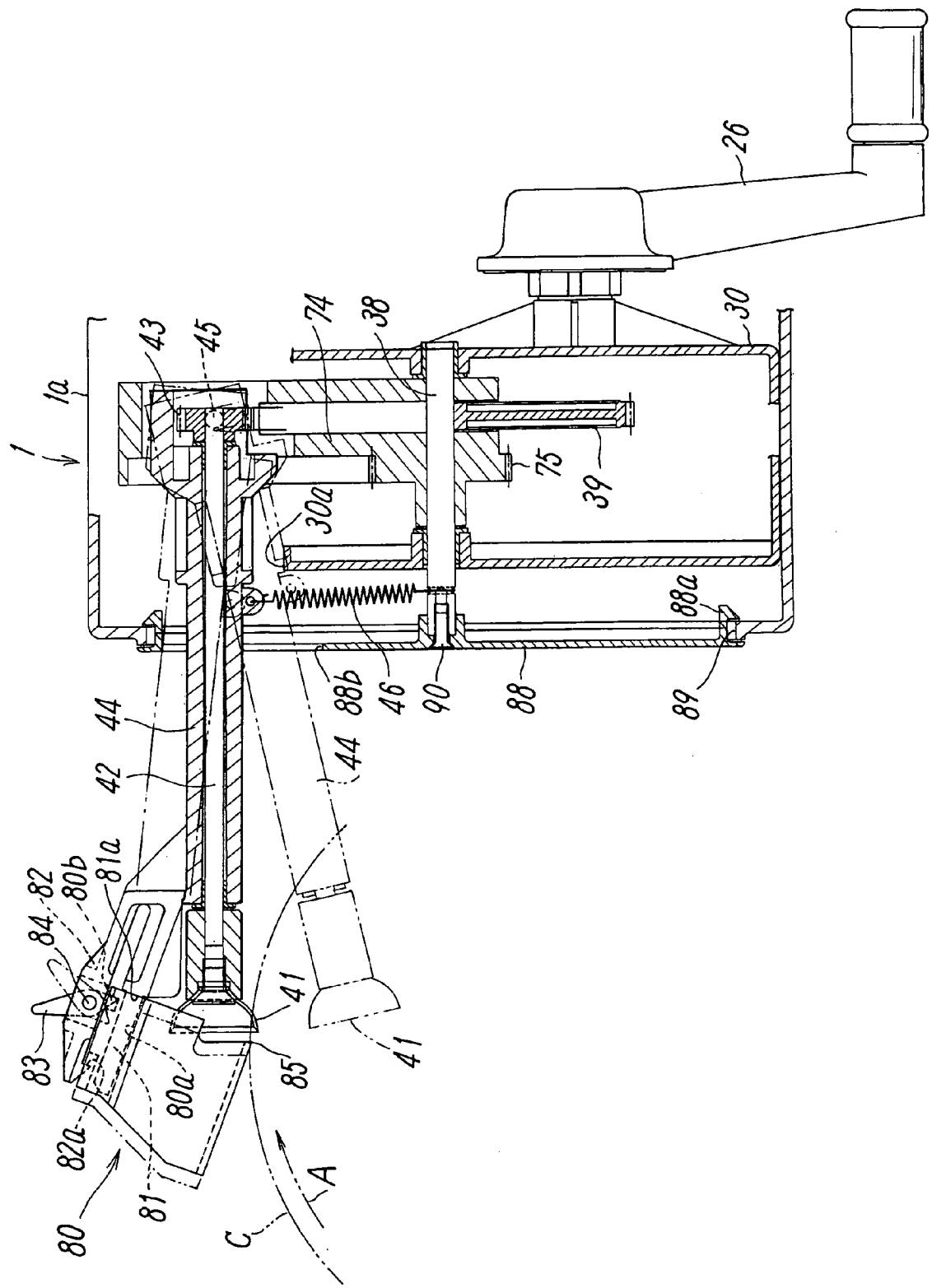
FIG. 5 is a sectional view showing a primary structure of a driving system for a rotating blade in the peeler according to the embodiment.

As shown in FIGS. 3 and 5, the rotating-blade support arm 44 for rotatably supporting the rotary shaft 42 of the cup-shaped rotating blade 41 is tiltably supported at its base end to the reciprocating swing lever 74 in the final stage of the rotating-blade swinging mechanism 60 by the pair of pins 45. This arrangement enables the rotating-blade support arm 44 to be tilted in a direction toward the fruit/vegetable C held between the clamp members 10 and 11 (i.e., toward the support shaft 38). A spring 46 for biasing the rotating-blade support arm 44 in the direction toward the fruit/vegetable C is disposed between the rotating-blade support arm 44 and the support shaft 38.

While the rotating-blade support arm 44 is tiltable, the small gear 43 mounted over the rotary shaft 42, which is rotatably inserted through the rotating-blade support arm 44, meshes with the large gear 39 for transmitting the rotation to the small gear 43. Therefore, the tilting motion of the rotating-blade support arm 44 must be limited to an angular range within which the meshing between the gears 43 and 39 is ensured.

As understood from the above description, the gear 31 mounted over the handle shaft 25, the gear 33 meshing with the gear 31, and the gears 34, 63 both integral with the gear 33 are shared by the speed increasing gear mechanism 40, the transmission gear mechanism 50, and the rotating-blade swinging mechanism 60. Also, the gear 36 meshing with the gear 34 and the gear 37 integral with the gear 36 are shared by the transmission gear mechanism 50 and the rotating-blade swinging mechanism 60.

Figure 6:
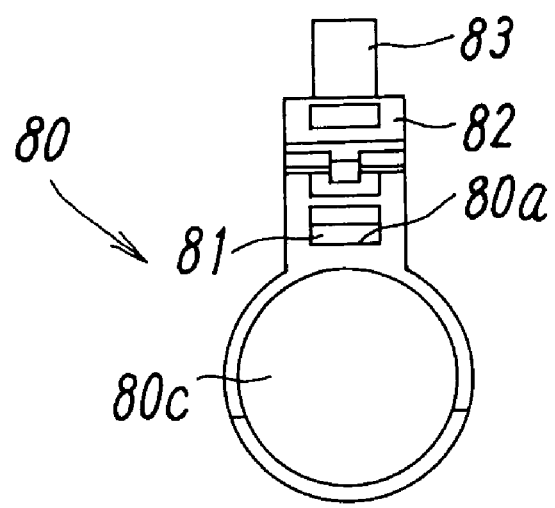
FIG. 6 is a front view showing a structure of a peeling thickness adjusting member provided on a rotating-blade support arm that supports the rotating blade.
Figure 7:
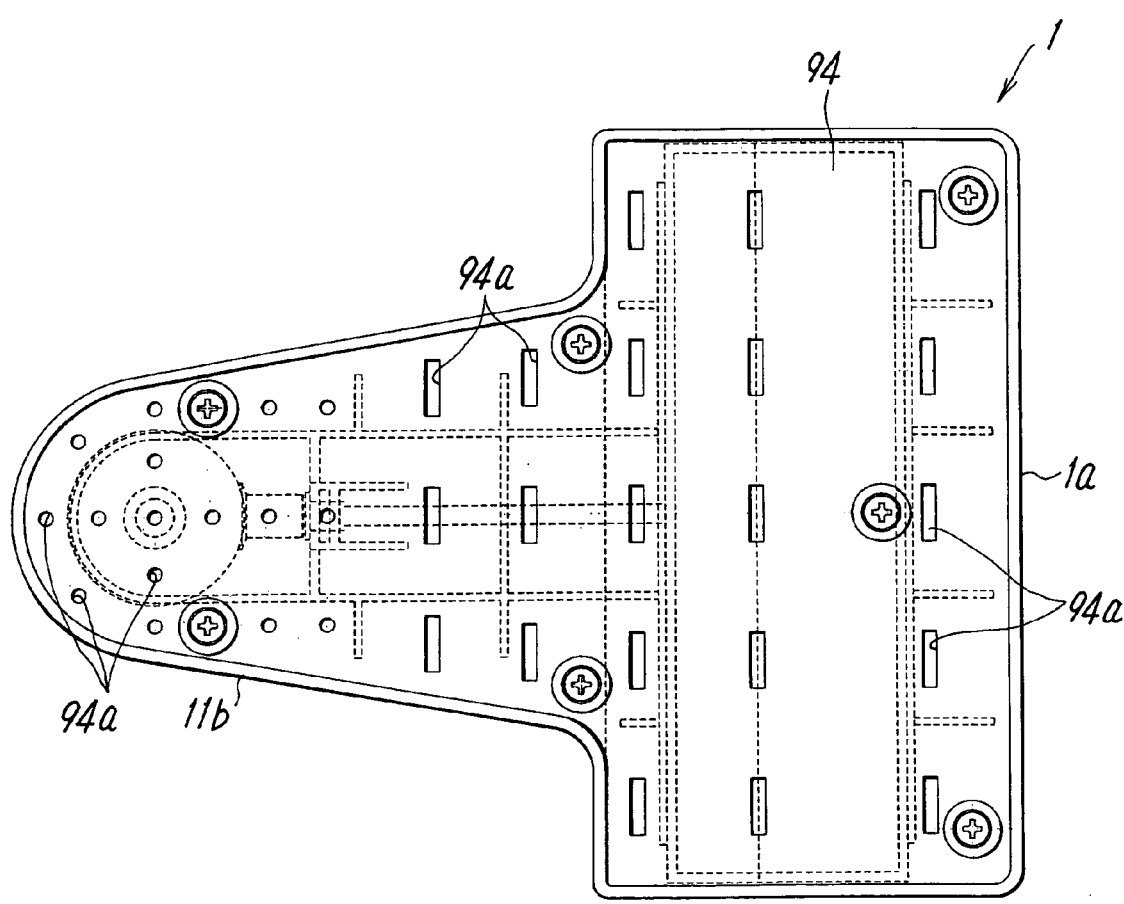
FIG. 7 is a bottom view of the peeler according to the embodiment.

As shown in FIGS. 5 and 6, the rotating-blade support arm 44 holding the rotary shaft 42 of the cup-shaped rotating blade 41 is provided with a thickness adjusting member 80 which abuts against the surface of the fruit/vegetable C immediately before the rotating blade 41 contacts with the surface of the fruit/vegetable C, thereby setting the thickness of the peeled skin (i.e., the peeling thickness).

For mounting the thickness adjusting member 80 to the rotating-blade support arm 44, the rotating-blade support arm 44 is provided at its a distal end with a guide portion 81 and an actuator support portion 82, which are extended beyond and the rotating blade 41 and projected obliquely in a direction away from the axis of the rotary shaft 42 of the rotating blade 41. A guided portion 80a of the thickness adjusting member 80 is slidably fitted to the guide member 81, and a fore end of an actuator 83 rotatably mounted to the actuator support portion 82 by a pin 84 is fitted into a recess 80b formed in a surface of the thickness adjusting member 80 facing the pin 84. At this time, at least the fore end of the actuator 83 is pressed into the recess 80b with elasticity of the actuator support portion 82 itself. Additionally, the actuator support portion 82 and the guide member 81 are provided with respective stopper portions 82a, 81a for setting two positions between which the thickness adjusting member 80 is movable.

Therefore, the actuator 83 can be stably held at two positions, i.e., a solid line position and a chain line position shown in FIG. 5. Correspondingly, the thickness adjusting member 80 can be displaced to a desired one of peeling-thickness setting positions in plural stages, i.e., a desired one of the solid line position and the chain line position shown in FIG. 5.

When the thickness adjusting member 80 is in the solid line position, a thickness setting corner 85 positioned at a fore end of the thickness adjusting member 80 on the side near the rotating blade 41 abuts against the surface of the fruit/vegetable C immediately before the rotating blade 41 contacts with the surface of the fruit/vegetable C rotating in the direction of an arrow A, thereby limiting a cut-in amount of the rotating blade 41. As a result, the skin of the fruit/vegetable C is cut at a thin peeling. On the other hand, when the thickness adjusting member 80 is moved to the chain line position, its thickness setting corner 85 positioned near the rotating blade 41 is retracted in the direction away from the surface of the fruit/vegetable C with respect to the rotating blade 41 contacting with the surface of the fruit/vegetable C, and then abuts against the surface of the fruit/vegetable C. As a result, the cut-in amount of the rotating blade 41 increases and the skin of the fruit/vegetable C is cut at a thick peeling.

As seen from FIG. 6, the thickness adjusting member 80 has a body portion in the tubular form having a diameter slightly larger than that of the rotating blade 41. The body portion is disposed so as to cover the rotating blade 41 when the guided portion 80a of the thickness adjusting member 80 is fitted to the guide portion 81 thereof. With such an arrangement, a hollow space 80c within the thickness adjusting member 80 functions as a passage through which the peeled skin is discharged. Thus, the skin of the fruit/vegetable C peeled by the cup-shaped rotating blade 41 turns its direction along an inner surface of the rotating blade 41 and is then discharged to a predetermined position through the hollow space 80c without scattering. The thickness adjusting member 80 serves also as a safety cover for the rotating blade 41.

Further, by designing the position of the thickness adjusting member 80 to be settable in multi-stages, the thickness of the peeled skin of the fruit/vegetable can be adjusted in multi-stages.

The support shaft 38 disposed in the support frame 30 and supporting the gear 32 and the large gear 39 is arranged with its axis extending toward the center of the fruit/vegetable C, and a disk 88 is mounted at the center thereof to the distal end of the support shaft 38 by a screw 90 so as to cover a circular opening 89 on the front side of the main housing portion 1a. The disk 88 is freely rotatable. Although an engaging portion 88a formed along a circumferential edge of the disk 88 is engaged with an edge of the circular opening 89, this engagement does not restrict the rotation of the disk 88. Further, the disk 88 has a slit 88b formed to extend in the radial direction, and the rotating-blade support arm 44 is inserted through the slit 88b. When the rotating-blade support arm 44 swings around the fruit/vegetable, the disk 88 is also rotated together with the rotating-blade support arm 44. The slit 88b is formed such that the tiltable rotating-blade support arm 44 biased by the spring 46 in the direction toward the fruit/vegetable C can be angularly moved within the tiltable range.

In addition, the housing 1 of the peeler has a grip 92 attached to the housing top, and a bottom plate 94 mounted to the housing bottom. The whole of the housing 1, including the grip 92, the bottom plate 94 and the disk 88, are made of synthetic resin for the purpose of reducing the weight. The support frame 30 for supporting the speed increasing gear mechanism 40, the transmission gear mechanism 50, and the rotating-blade swinging mechanism 60 is also made of synthetic resin. Other main components of the driving system, such as the gears constituting those mechanisms 40, 50 and 60, are further made of synthetic resin. Components made of metal are limited to some small parts that must be made of metal from the viewpoint of strength, such as the springs, the long rotary shafts, the screws, and the pins.

Thus, since most components of the peeler are made of synthetic resin, the total weight can be greatly reduced, and therefore the peeler is very convenient when carried with the grip 92 held by the user's hand and stored. In addition to that feature, since the peeler is operated by manually rotating the handle, it is suitable for peeling a small amount of fruits and vegetables in general homes. Further, the peeler has no electrically driven components inside and outside the housing. This feature also contributes to reducing the housing weight.

Moreover, most components of the peeler are made of synthetic resin and no electrically driven components are used inside and outside the housing 1, the peeler can be washed in whole with water after the use. For draining water after the washing, many water drain holes 94a are bored through the bottom plate 94 of the housing 1.

In the operation of the peeler having the structure described above, when the fruit/vegetable C is held at its both ends by the pair of clamp members 10, 11 of the clamp rotating mechanism and the handle 26 is manually rotated, the rotation is transmitted to the rotary shaft 12 of the clamp member 10 through the transmission gear mechanism 50 in the housing 1, to thereby rotate the fruit/vegetable C. Further, the rotation of the handle shaft 25 is transmitted to the cup-shaped rotating blade 41 through the speed increasing gear mechanism 40, and at the same time the rotation of the handle shaft 25 causes the rotating-blade support arm 44 to swing through the reciprocating swing lever 74 of the rotating-blade swinging mechanism 60. As a result of those operations combined with each other, the rotating blade 41 pressed by the spring 46 against the fruit/vegetable C held between the clamp members 10 and 11 is moved along the circumference of the fruit/vegetable C while peeling the skin of the fruit/vegetable C. Hence, the fruit/vegetable C can be almost entirely peeled except for both the end portions where the fruit/vegetable C is held by the clamp members.

In the case of, as intended by this embodiment, manually operating the peeler for a reduction of the size and weight without using motors, it is difficult to operate a plurality of handles. In the peeler of the embodiment, however, the single handle 26 is employed to drive the clamp member 10 in the clamp rotating mechanism, to rotate the cup-shaped rotating blade 41, and to move the rotating blade 41 along the surface of the fruit/vegetable C with the swing motion of the rotating-blade support arm 44. Accordingly, the fruit/vegetable can be easily peeled by one operator rotating the single handle.

At that time, the thickness of the peeled skin of the fruit/vegetable C is set to the predetermined value by previously moving the thickness adjusting member 80 provided on the rotating-blade support arm 44 to a desired one of the plural setting positions. Stated another way, since the rotating blade 41 and the thickness adjusting member 80 are always pressed against the surface of the fruit/vegetable C by the spring 46, the rotating blade 41 is cut into the fruit/vegetable within the allowable range limited by the thickness adjusting member 80. As a result, the skin of the fruit/vegetable is peeled at the preset thickness.

Since the above-described peeler employs no motors, the overall peeler size can be reduced. Furthermore, the housing 1 is made of synthetic resin, and so are the support frame 30 for supporting the speed increasing gear mechanism 40, the transmission gear mechanism 50, and the rotating-blade swinging mechanism 60, as well as other main components of the driving system, such as the gears constituting those mechanisms 40, 50 and 60. In other words, except for some small metal-made parts, such as the springs 21, 46, the long rotary shafts 42, 55, the gear support shafts 32, 35 and 38, the screws, and the pins, the other components are made of synthetic resin. Therefore, the total weight can be reduced and the peeler is very convenient when carried with the grip 92 held by the user's hand and stored. Thus, in combination with the above-mentioned feature of the manual operation, the peeler is suitable for peeling a small amount of fruits and vegetables in general homes.

In addition, since neither motors nor any other electrically driven components are employed, the primary components are made of synthetic resin, and the many water drain holes 94a are bored through the bottom plat 94 for draining water, the peeler can be washed in whole with cold or warm water, and hence work for cleaning and storing the peeler after the use can be very easily performed.

What is claimed is:

1. A fruit and vegetable peeler comprising:
a clamp rotating mechanism including a pair of clamp members supported by a housing to lie on an axis of rotation of one piece of fruits and vegetables in opposed relation, one of said pair of clamp members being rotatable by a rotary shaft, the other clamp member being movable in directions in which said clamp members approach or depart away from each other, thereby rotating the one piece of fruits and vegetables while holding both ends of the one piece of fruits and vegetables; and
a handle fixed to a handle shaft extended externally of said housing,
wherein said housing accommodates a speed increasing gear mechanism for transmitting rotation of said handle shaft to a cup-shaped rotating blade, a transmission gear mechanism for transmitting the rotation of said handle shaft to the rotary shaft of said clamp member, and a rotating-blade swinging mechanism for converting the rotation of said handle shaft into a swing motion causing said rotating blade to swing along the circumference of the one piece of fruits and vegetables held between said pair of clamp members from a position near one of said clamp members to another position near the other clamp member in a reciprocating manner, and said housing is made of synthetic resin, and a support frame for supporting said speed increasing gear mechanism, said transmission gear mechanism, and said rotating-blade swinging mechanism, as well as gears constituting said mechanisms are made of synthetic resin.

2. The fruit and vegetable peeler according to claim 1, wherein said clamp members are supported to said housing through a closely-analogous translation mechanism that one of said pair of clamp members, which is movable in the directions in which said clamp members approach or depart away from each other, is rotatably coupled at two axially spaced positions to said housing by support levers being substantially parallel to each other and having almost the same length, and a spring is fitted to a joint portion between one of said support levers and said housing, thereby urging said one clamp member in the direction toward said other clamp member.

3. The fruit and vegetable peeler according to claim 1 or 2, wherein a rotating-blade support arm for holding a rotary shaft of said cup-shaped rotating blade is tiltably supported at a base end thereof to a reciprocating swing lever in a final stage of said rotating-blade swinging mechanism for causing said rotating blade to swing along the circumference of the one piece of fruits and vegetables in a reciprocating manner such that said reciprocating swing lever is tilted in a direction toward the center of the one piece of fruits and vegetables within a range in which meshing between a gear mounted over the rotary shaft of said rotating blade and a gear of said speed increasing gear mechanism for transmitting rotation to the former gear is ensured, and a spring force for biasing said rotating-blade support arm in the direction toward the center of the one piece of fruits and vegetables is exerted to act on said rotating-blade support arm.

4. The fruit and vegetable peeler according to claim 1 or 2, wherein a rotating-blade support arm for holding a rotary shaft of said cup-shaped rotating blade is provided with a thickness adjusting member which abuts against the surface of the one piece of fruits and vegetables immediately before said rotating blade contacts with the surface of the one piece of fruits and vegetables, thereby setting the thickness of a peeled skin, said thickness adjusting member being displaceable to one of multi-stage setting positions for the thickness of the peeled skin.

5. The fruit and vegetable peeler according to claim 1 or 2, wherein said peeler has no electrically driven components inside and outside said housing, and many water drain holes are bored through a bottom plate of said housing for draining water after washing of said peeler.

6. The fruit and vegetable peeler according to claim 1 or 2, wherein a grip is attached to a top of said housing.

* * * * *